(12) United States Patent
Ziolkowski

(10) Patent No.: US 11,519,809 B2
(45) Date of Patent: Dec. 6, 2022

(54) SYSTEM AND METHOD FOR GAS SENSING AND MONITORING

(71) Applicant: OPERATIONS TECHNOLOGY DEVELOPMENT, NFP, Des Plaines, IL (US)

(72) Inventor: Chris Ziolkowski, Elmhurst, IL (US)

(73) Assignee: OPERATIONS TECHNOLOGY DEVELOPMENT, NFP, Des Plaines, IL (US)

( * ) Notice: Subject to any disclaimer, the term of this patent is extended or adjusted under 35 U.S.C. 154(b) by 10 days.

(21) Appl. No.: 16/211,461

(22) Filed: Dec. 6, 2018

(65) Prior Publication Data
US 2019/0170601 A1    Jun. 6, 2019

Related U.S. Application Data

(60) Provisional application No. 62/595,347, filed on Dec. 6, 2017.

(51) Int. Cl.
*G01M 3/16* (2006.01)
*G01N 1/22* (2006.01)

(52) U.S. Cl.
CPC ............ *G01M 3/16* (2013.01); *G01N 1/2294* (2013.01)

(58) Field of Classification Search
CPC ......... G01M 3/04; G01M 3/16; G01N 1/2294
See application file for complete search history.

(56) References Cited

U.S. PATENT DOCUMENTS

| | | | | |
|---|---|---|---|---|
| 3,610,048 A | * | 10/1971 | Weeks | G01N 1/2294 73/863.23 |
| 5,355,739 A | * | 10/1994 | Cooper | E21B 49/084 422/83 |
| 5,425,268 A | * | 6/1995 | Li | G01N 33/1886 73/10 |

(Continued)

FOREIGN PATENT DOCUMENTS

| | | | | |
|---|---|---|---|---|
| BR | PI1106204 A2 | * | 8/2013 | |
| CN | 202693568 U | * | 1/2013 | ......... G01N 33/0009 |

(Continued)

OTHER PUBLICATIONS

U.S. Patent Office, English language version of the International Search Report, Form PCT/ISA/210 for International Application PCT/US2019/15397, dated Apr. 24, 2019 (2 pages).

(Continued)

*Primary Examiner* — Daniel S Larkin
*Assistant Examiner* — Fatemeh Esfandiari Nia
(74) *Attorney, Agent, or Firm* — Pauley Erickson & Swanson

(57) ABSTRACT

A system, device, and method for leak detection and monitoring. The system includes a plurality of gas sensors with wireless connectivity adapted to be distributed over an area of interest that contains a suspected gas leak. An aggregator aggregates leak detection data obtained from the plurality of gas sensors. At web-based user interface allow viewing of the data on any of various non-specific electronic devices. The user interface is simultaneously accessible on a plurality of wireless mobile devices. A wireless local area network, such as a mesh network with the sensors as nodes, interconnects each of the plurality of gas sensors and the aggregator.

14 Claims, 6 Drawing Sheets

(56) References Cited

U.S. PATENT DOCUMENTS

| | | | | |
|---|---|---|---|---|
| 5,760,706 | A | * | 6/1998 | Kiss .................. H01Q 1/04 340/10.34 |
| 6,314,793 | B1 | | 11/2001 | Webb et al. |
| 6,679,098 | B2 | * | 1/2004 | Cardinale ............. G01N 1/24 73/23.2 |
| 6,794,991 | B2 | * | 9/2004 | Dungan ............ G01N 33/0073 340/539.22 |
| 2002/0073767 | A1 | * | 6/2002 | Webb .................. G01M 3/20 73/40.7 |
| 2006/0102844 | A1 | | 5/2006 | Sauer et al. |
| 2007/0229825 | A1 | | 10/2007 | Bates |
| 2013/0013228 | A1 | | 1/2013 | Genta |
| 2014/0123625 | A1 | * | 5/2014 | Snell .................. F02C 9/28 60/204 |
| 2016/0307468 | A1 | | 10/2016 | Trumbull et al. |
| 2017/0187541 | A1 | | 6/2017 | Sundaresan et al. |
| 2017/0193790 | A1 | * | 7/2017 | Cornwall ............. G01D 21/00 |
| 2018/0024091 | A1 | * | 1/2018 | Wang ................... H04B 1/713 204/431 |
| 2019/0033160 | A1 | * | 1/2019 | Dittberner ............. G01N 27/04 |
| 2019/0145891 | A1 | * | 5/2019 | Waxman ............... G01J 3/0208 356/409 |
| 2020/0019128 | A1 | * | 1/2020 | Brooks ................. G05B 13/04 |

FOREIGN PATENT DOCUMENTS

| | | | | |
|---|---|---|---|---|
| KR | 20170050244 | A | * | 5/2017 |
| KR | 102171557 | B1 | * | 10/2020 |
| WO | WO-2011068287 | A1 | * | 6/2011 ............. H04Q 9/00 |
| WO | WO 2017/116802 | A1 | | 12/2016 |

OTHER PUBLICATIONS

U.S. Patent Office, English language version of the Written Opinion of the International Searching Authority, Form PCT/ISA/237 for International Application PCT/US2019/15397, dated Apr. 24, 2019 (7 pages).

EPO, English language version of Partial Supplementary European search report for EP Application No. 19728855.8, dated Feb. 1, 2022 (12 pages).

* cited by examiner

SYSTEM AND METHOD FOR GAS SENSING AND MONITORING

CROSS REFERENCE TO RELATED APPLICATION

This application claims the benefit of U.S. provisional patent application Ser. No. 62/595,347, filed on 6 Dec. 2017. The co-pending provisional patent application is hereby incorporated by reference herein in its entirety and is made a part hereof, including but not limited to those portions which specifically appear hereinafter.

BACKGROUND OF THE INVENTION

Field of the Invention

This invention relates generally to gas sensing and monitoring and, more particularly, to improved methods, devices, and systems of or for remote gas sensing and monitoring such as by or for first responders.

Description of Related Art

During times of natural gas emergency situations or leak investigations, first responders need a way to assess the atmosphere within a confined space or building before entering and/or subjecting themselves to exposure. Leak investigation personnel must often record gas concentrations at multiple locations in a test site. Personnel safety is enhanced by not requiring them to re-enter areas that are found to have methane present to take additional readings. Long term monitoring may require personnel to be present for hours or to make multiple visits over several days.

Thus, there is a need and a demand for devices, systems, and methods to remotely monitor the level of gases during emergency situations. Such devices, systems, and methods can desirably provide critical information to first responders and gas company personnel, allowing them to determine the concentration of methane, CO, and possibly other key indicators inside buildings, sewers, and other structures from a safe distance. Further there is a need and a demand devices, systems and methods that allow such monitoring to be appropriately automated.

SUMMARY OF THE INVENTION

The subject invention is generally related to improved methods, devices and systems of or for remote gas sensing and monitoring, such as by or for first responders.

The invention includes a system for leak detection and monitoring with a plurality of gas sensors (e.g., methane sensors) having wireless connectivity adapted to be distributed over an area of interest that contains a suspected gas leak. An aggregator collects and aggregates the leak detection data obtained from the plurality of gas sensors. At least one display user interface displays and/or allows viewing of the data. The at least one display user interface desirably includes a web browser displayable on a wireless mobile unit, and the at least one display user interface is desirably simultaneously accessible on a plurality of wireless mobile unit. Embodiments of this invention desirably provide a user interface as a web app that can be accessed with a phone or tablet.

The system desirably includes a wireless local area network interconnecting each of the plurality of gas sensors and the aggregator. Embodiments of this invention use a mesh network that is self-organizing and will relay messages. Any user that is close to a sensor node can log in and see all the sensors; this allows multiple personnel to work at a site. No one has to have the 'magic box.'

The invention further includes a method for remote gas sensing in an area of interest, the method comprising: aggregating data obtained from a plurality of gas sensors having wireless connectivity distributed over the area of interest, and displaying the aggregate data in a user interface via a web browser. A first responder present at the area of interest can selectively position one or more of the plurality of gas sensors, and the aggregate data page is accessible via one or more wireless mobile display devices.

Embodiments of this invention include a device that can be left in place for several days. This stems from a requirement to monitor a leak prior to its repair and then for several days after; this requirement currently ties up personnel that could be doing higher value activities. A long range, low power radio (LoRa) can be used to allow the sensor nodes to be small and have a good battery life. These communicate with a base station that aggregates the data and pushes it to the web. The user interface is then web based.

Embodiments of this invention further include a tool to gauge the relative methane leak rate from Class 2 and 3 leaks.

Other objects and advantages will be apparent to those skilled in the art from the following detailed description taken in conjunction with the appended claims and drawings.

DETAILED DESCRIPTION

Figure 1:
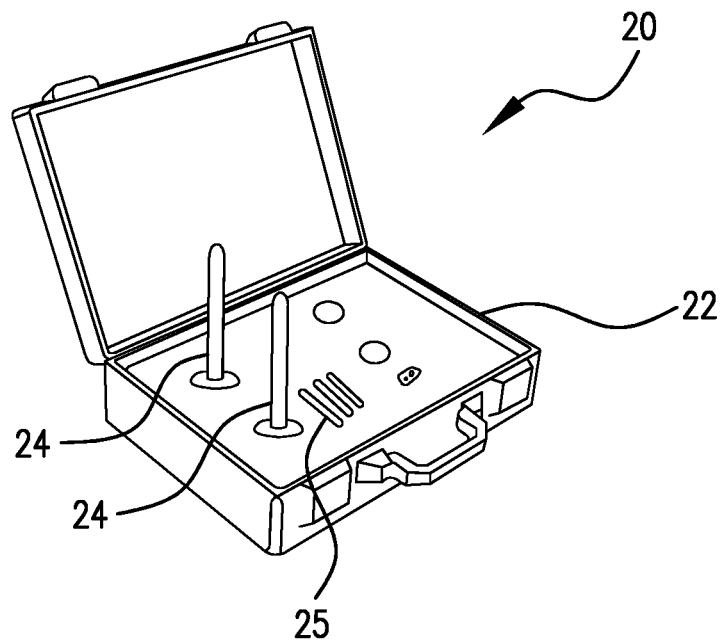
FIG. 1 is a device for leak detection and monitoring according to one embodiment of this invention.

The subject invention includes methods, devices, and systems of or for remote gas sensing and monitoring, such as by or for first responders.

The safety of workers, first responders, and the general public can be greatly increased by being able to remotely monitor the gas atmosphere inside buildings, near or in enclosed spaces, and the like such as herein provided. In addition, continuous remote monitoring of various gas levels during known gas leak investigations will allow for better and quicker analysis of the situation. The remote sensors of this invention can be placed and/or operated in multiple buildings, sewers, and other structures in the area of a known gas leak. The remote device can wirelessly provide real-time information back to the crew regarding the gas levels in the structures.

Gas sensing and monitoring, such as herein provided, can be used during leak pinpointing/surveys and emergency situations, for example. Such sensing, detection, and/or monitoring can be of great assistance during the initial evaluation of a reported as leak, and also as an ongoing monitoring device throughout the duration of the activities to address the gas leak situation. Possible users of the subject development can include, gas utility or other first responders, firefighters, gas utility crews assessing the situation, gas utility crews working on the emergency situation, utility management overseeing the emergency situation, and/or other industries (industrial, chemical, oil, and gas) to monitor and assess leaking gas situations. The ability to remotely monitor the level of natural gas and other gases (such as CO) increases the safety of all personnel involved and the general public.

In accordance with one aspect of the subject invention, multiple gas sensors with wireless connectivity are distributed over an area that contains a suspected gas leak. The data from these multiple sensors can desirably be aggregated and served as a web page. In one embodiment, the first responder is actively present on the site and positions several sensor nodes. The nodes expose WiFi access points that the responder can attach to with a phone or tablet so as to be able to see the gas concentration values and other data of interest. The nodes are in communication with one another, so that the reading from all or selected ones of the nodes are available on a single web page. Moreover, if more than one responder is present, it is possible for additional personnel to view the data from their own device by opening more instances of the web page. In another embodiment, sensor nodes are distributed at a leak site and left unattended for long periods, such as measured in days rather than hours. In this case the gas concentrations and other data can be desirably sent or transmitted to a cloud-based server such as by using an appropriate long range wireless link. Again, the aggregate data from all or selected one of the sensor nodes can be viewed or accessed such as via a web page. This aggregate data is accessible with any device that can support a modern browser.

FIG. 1 illustrates a representative device 20 for leak detection and monitoring, such as for leak surveyors to work a large investigation site. The device 20 includes a housing 22, embodied as a clamshell case for transport. Within the housing 22 is a sensor for detecting natural gas or other gaseous compositions. An exemplary sensor is a Figaro TGS2611 methane sensor, which can be used for detection in the LEL range. They can also have a pre-filter, such as an activated charcoal pre-filter that screens out reaction to heavier hydrocarbons such as propane. Any necessary fan(s) or other air moving component can be included for moving air from intake opening 25 to, over, and/or through the sensor for detection purposes.

The device 20 further includes necessary control hardware and a communication module that communicates by, for example, radio, WiFi, Bluetooth, or other short range communications protocol. Longer range communication components can be included additionally or alternatively, as discussed further below. Any necessary antenna 24 or equivalent can be included in combination with the communication module. Two WiFi antennae 24, as shown in FIG. 1, may be needed, for example, with one to support peer-to-peer communication on a mesh and one to support the user interface connection.

The device 20 can be carried to and activated at a desired location for leak detection or monitoring. Detection or other information from the device 20 can be accessed via software applications. A custom, device-specific app can be used, but a web-based app is generally preferred to be compatible with many electronic devices, such as phones, tablets, laptops, etc.

Figure 2:
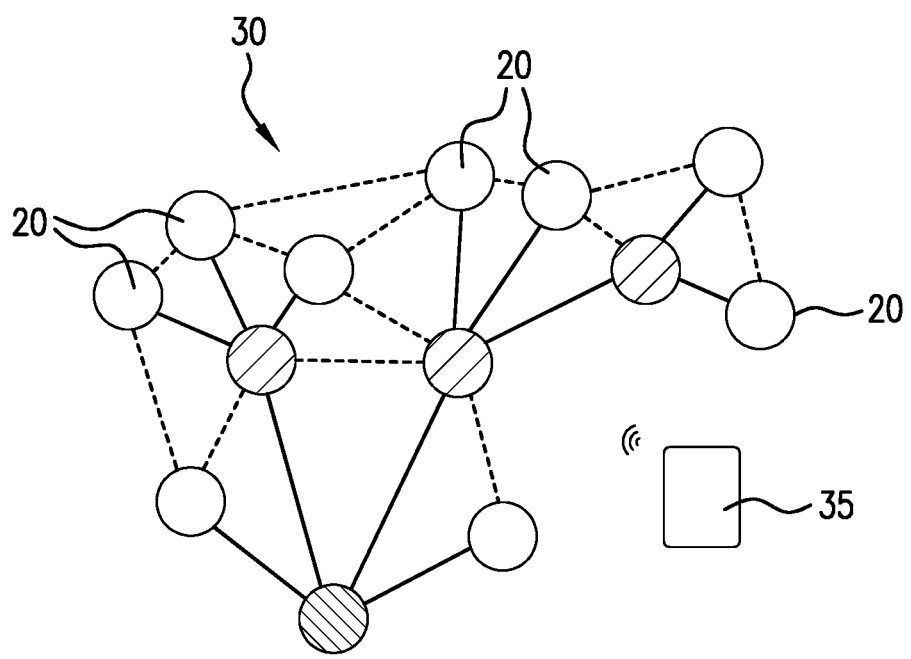
FIG. 2 illustrate a local area mesh network according to one embodiment of this invention.

FIG. 2 illustrates a wireless communication protocol for more than one device 20. FIG. 2 shows a mesh network 30 between the sensor nodes 20. The mesh network 30 relays messages between nodes 20 and to any mobile device or other aggregator 35, so that all are in communication coverage. This is in contrast to other usable networks like a star network that requires that all sensor nodes have one line of sight route to a designated central or coordinator node. The routes between various mesh nodes are not fixed in advance. There are multiple routes available for message passing, and alternative routes can be used as conditions change or nodes need to be repositioned. Any suitable mesh system can be incorporated, such as provided by Project Byzantium, Babel, OLSR, and/or Meschblu. Using mesh capability, prototype testing was able to cover several 100 feet by daisy chaining sensor nodes.

The system of this invention includes a user interface, preferably implemented as a web-based application as discussed above. Any modern mobile device with WiFi and a browser can support the interface. This eliminates the need for separate app development across multiple platforms. Another advantage of this approach is that every node in the mesh has the identical capability to serve the user interface. There is no proprietary, master device required to access the sensor data. In embodiments of this invention, the sensor nodes are distributed to various locations of interest within the leak survey area. As the sensor nodes are activated an ad hoc mesh network is formed. Users in different locations within the survey area have access to the same data via the mesh sensor node they are closest to. If additional personnel join in the investigation they can also log in and see the data from all the nodes.

Figure 3:
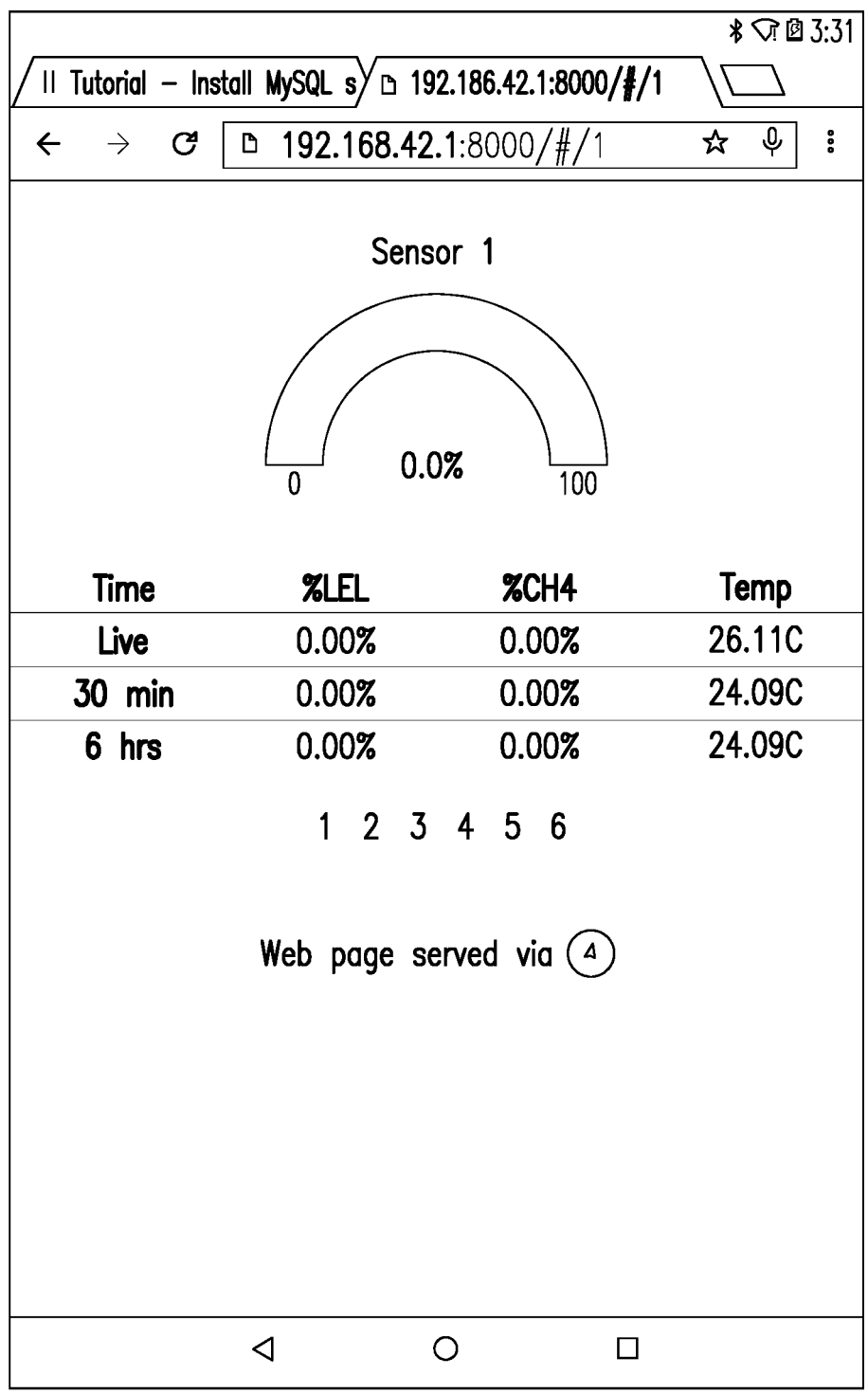
FIG. 3 illustrate a graphical user interface (GUI) according to one embodiment of this invention.

FIG. 3 shows a user interface according to an exemplary embodiment of this invention. The wireless mesh network illustrated allows access to six methane sensor nodes in different locations. The view of FIG. 3 allows the user to select a specific sensor by using the row of numbered buttons below the main display. The level is calibrated in percent LEL. The title "Sensor 1" at the top of the display indicates that the data shown is from node 1. The numeral inside the circle indicates which sensor node the tablet is being served the web page from (in this ease node 4). Each node is capable of serving the display page and maintaining contact with all the other sensor nodes in the mesh network. The greyed out selection button indicates that node 5 is not currently attached to the mesh. In a prototype application, rotating the phone/tablet by 90 degrees allows the user to view a strip chart with all the sensor nodes data displayed for the last 30 minutes. The strip chart view can be used for identifying trends in the data.

Figure 4:
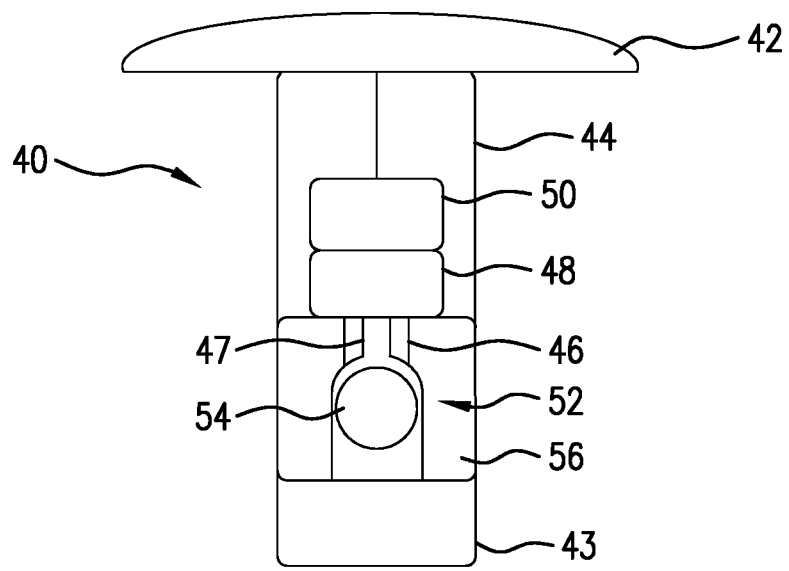
FIG. 4 is a device for leak detection and monitoring according to one embodiment of this invention.

Various sizes, shapes and configurations are available for the detection device according to this invention. FIG. 4 illustrates a device 40 according to another embodiment of this invention, preferably for use in unattended methane monitoring device. This monitor would be placed in the vicinity of a suspected (or recently repaired) leak to desirably provide at least 48 hours of unattended monitoring. Placement of the device 40 would be, for example, at the discretion of the investigator, determined by the hazards at a particular site. The device 40 desirably sends wireless notification of methane levels back to the utility in real-time. The form factor of this 'leave behind' device is also preferably unobtrusive so as not to attract theft or vandalism.

The system will provide continuous monitoring of methane levels and alerts if excessive levels develop.

Figure 5:
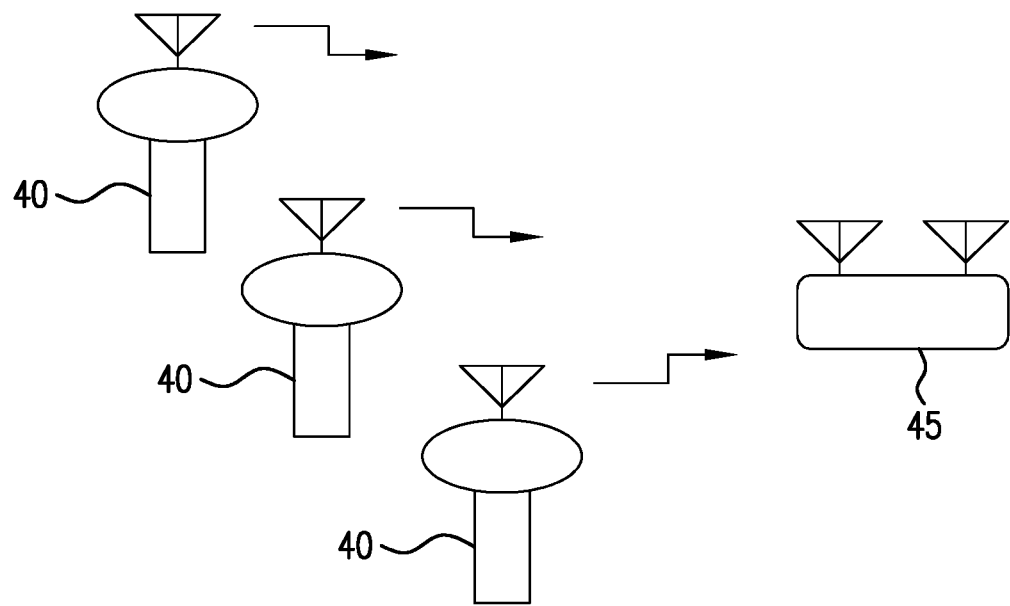
FIG. 5 illustrate a local area network according to one embodiment ref this invention.

In embodiments of this invention, the system includes two types of modules: the sensor module, e.g., device 40, for a methane sensor and a local radio link, and another for the cellular GPS, and local radio connection. The sensor modules contain a methane sensor, a low power radio, and a battery; in short, the bare minimum number of components needed to collect and send readings. The second module will be larger to accommodate the necessary batteries and could be secured to a lamppost, utility pole, or other fixed feature. As shown in FIG. 5, the methane monitoring system incorporating the device 40 desirably includes multiple sensor devices/nodes 40 that communicate wirelessly with an aggregator base station 45 as the second module. The sensor nodes 40 have been designed to be inserted into a barhole or equivalent with minimal exposure above ground. The base station 45 acts as a bridge between the low power radio and the Internet via a cellular network and/or a land line, etc. The base station 45 can capture data from nearby sensor nodes 40, store it, and provide it to a server. The data aggregated at the server is exposed as a web page that can be remotely viewed by any device with internet access and proper credentials.

In testing, a radio range from the node 40 to the base station 45 of about a half a mile has been obtained with a low profile, traffic rated antenna. A battery life of the sensor nodes 40 of roughly 7 days has been obtained with a reading every 5 minute, and the battery life can be extended with a lower rate. Various different sensors can be used to further optimize battery life.

In embodiments of this invention, an exemplary radio for carrying the sensor readings follows a recent standard for low-power, long-range radios known as LoRa. There is also an evolving protocol for aggregating multiple radios into a wide area network: LoRaWAN. The basis for the choice was a combination of power consumption and communication range. LoRaWAN has a good balance of attributes. It has an adaptable data rate that is suitable for transferring small packets of data, such as telemetry readings. It has good range and is a non-proprietary standard. By contrast, useable alternative SigFox is a proprietary standard that operates at a fixed, low data rate. In addition, 2G/3G cellular devices provide higher data rates at the expense of more power consumption and requiring a SIM with its associated monthly charge.

Referring to FIG. 4, the device 40 includes a sensor 46. A sensor used in prototype testing of a device according to FIG. 4 included an infrared technology sensor manufactured by Dynament (UK). The sensor 46 can be connected directly to a control/radio module 48. A battery 50 is further included to power the components.

A low-profile, flattened, and/or 'planar' antenna 42 is included to impart a low profile. A standard quarter-wavelength whip style antenna would be both noticeable and fragile in this application. The planar antenna is positioned on a circular aluminum ground plane; the plane is necessary for proper operation. An exemplary antenna is a Road Marker model antenna that is manufactured by Taoglas, with the ground plane is an intrinsic part of the device. During prototype testing, the range was found to be roughly ½ mile with the antenna level with the ground.

The device 40 of FIG. 4 includes an above-ground antennae 42, and a below ground stem 44 with flow opening inlet 43. The device 40 desirably is able to exclude water while providing for the entry of methane. The stem 44 includes a check valve 52 upstream of inlet 43, and with a floating ball 54 that closes sensor passageway 47 when water enters inlet 43 and stem 44. The methane sensor 46 and the ball check valve 52 are in a plastic sub-housing 56. Fully assembled prototype dimensions were 8" total length, 1⅝" diameter stem, and a 4" diameter antenna head.

According to embodiments of this invention, once a gas reading is taken on device 40 it is forwarded through a number of different channels before it is populated onto the user interface dashboard for viewing as shown in FIG. 5. The gas reading is taken on the device 40, and sent to the base station 45 in the local area. From the base station, the gas reading is sent to and stored in a server, for example, a DynamoDB database within an Amazon Web Services (AWS) instance. An Elastic Beanstalk application or equivalent can be running in the AWS instance and constantly looking at the new readings being feed into the database. This application is responsible tier serving the dashboard webpage to the user and transferring new readings from the database to the dashboard in real-time.

The base station 45 is a primary locus in the overall operation of the system. Desirably all node data is passed through one base station device. The base station can be capable of handling up to 3500 node connections using the LoRaWAN specification. A base station can be customized to additionally or alternatively include other wireless technologies including Bluetooth, WiFi, Cellular, and OPS. Once a gas reading is received over LoRaWAN from a device 40 it is forwarded over cellular to the server. Using Node-Red and a Node-Red AWS plugin it is possible to securely transfer gas readings from the base station over the Internet to AWS using MQTT as the messaging protocol. In the case the cellular is not available, WiFi or Ethernet can be supplemented.

In embodiments of this invention, the system includes a device that can provide a rough measurement of the gas leakage rate in the field while investigating leaks on distribution piping. Utilities will use this information to prioritize the repair of grade 3 leaks by their rate of emission and can also use this leak rate information in prioritizing segments for main replacement programs. The basic measurement components of flow detection devices of embodiments of this invention include a methane sensor, a flow sensor, and a small fan to draw a sample through the system. Temperature and relative humidity sensors can also be added. These sensors track the methane concentration and the total air volume flow; methane flow can be derived from this data.

Figure 6:
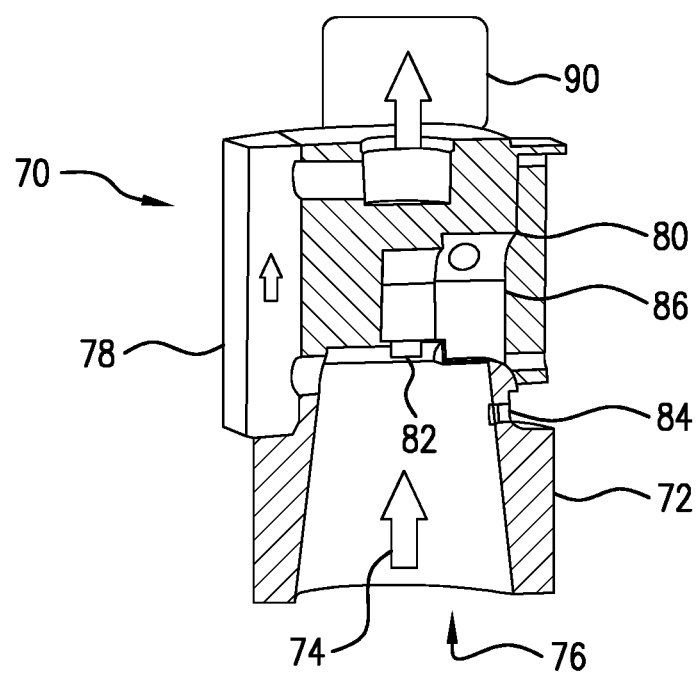
FIG. 6 is a device for leak and flow rate detection and monitoring according to one embodiment of this invention.

FIG. 6 shows a device 70 with a 3D printed housing 72 fabricated to contain sensors, fan, control (Yun) board, and power supply components. The housing of FIG. 6 is designed to sit atop a standard traffic cone or equivalent as a collection device. A variety of other emission collectors could also be mated such as a fabric 'pop-up tent' or other umbrella structure that could be deployed when a greater surface area needs to be covered.

The sensor housing 72 provides a flow path 74 that draws air from an inlet 76, such as is atop of the cone, or other collector, and through/past several sensors. The flow path 74 is completed by a flow sensor 78 that is attached to the side of the housing 72. All of the flow passes through this sensor 78. An interior pocket 80, separate from the flow path 74, houses the methane sensor 82, an optional temperature humidity sensor 84, and the control electronics 86.

A fan 90 draws air from atop the housing 72. The flow sensor 78 of a prototype generally represented a constriction in the measurement path. A rotating vane flow meter with a lower pressure drop can be used instead of a thermal flow sensor, to lower the fan power requirement and the overall power consumption.

In embodiments of this invention, the method of use begins with a capture of a rough methane concentration with the fan off, then to start the fan, then measure the flow and methane concentration. The concentration should approach a steady state after a few minutes of flow; explicitly measuring the flow quantifies the dilution of the gas by air. The fan speed can be varied under software control.

Figure 7:
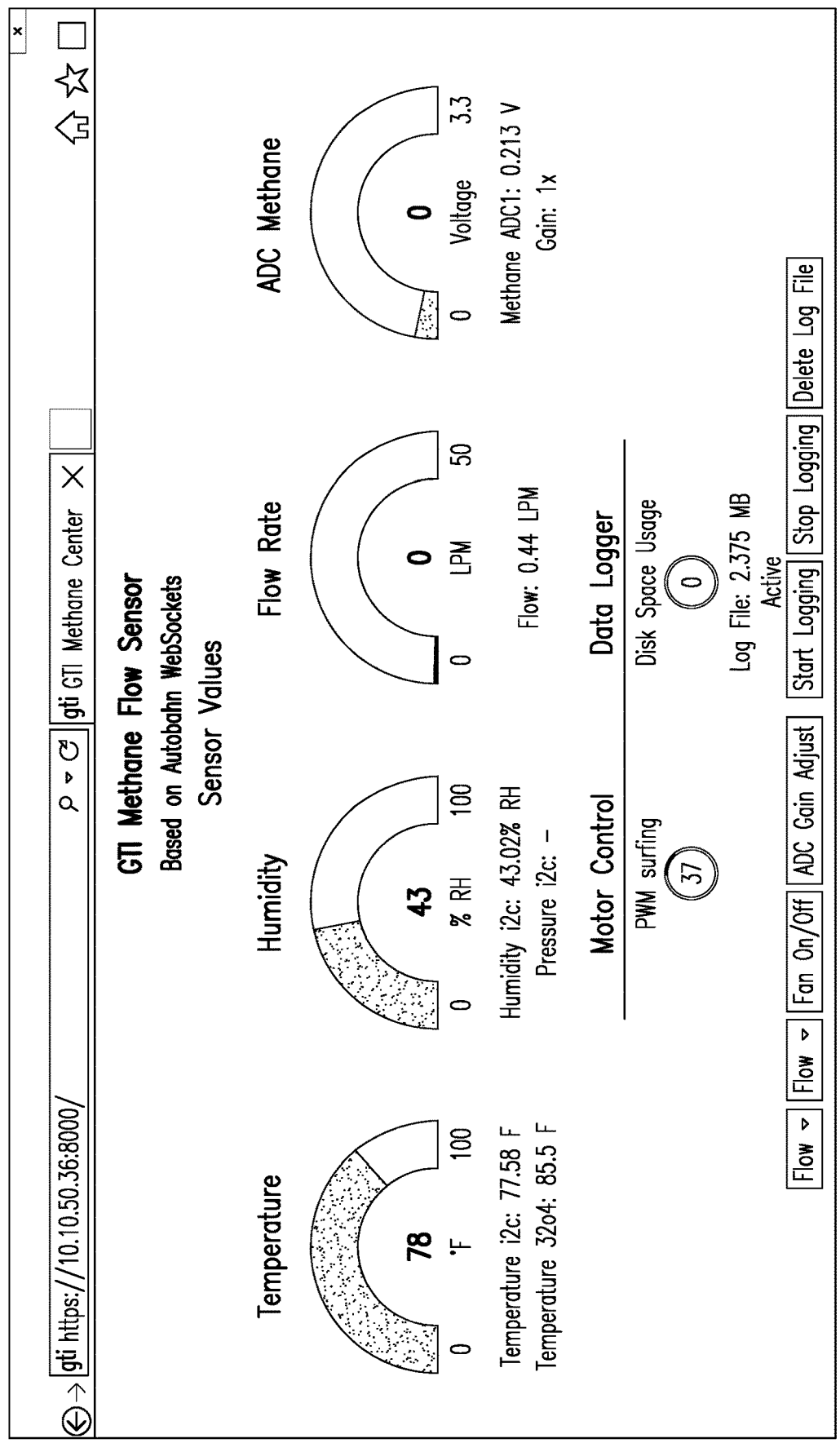
FIG. 7 illustrate a graphical user interface according to one embodiment of this invention.

The flow rate sensor device can be implemented in the mesh or other networks discussed above. The methane sensor 82 is positioned such that the air stream from the inlet 76 impinges there on. FIG. 7 shows an exemplary webpage user interface that provides the flow in SCFH, as well as the temperature, humidity, and methane amount. The methane concentration has been scaled in % LEL rather than raw voltage in the final version.

Figure 8:
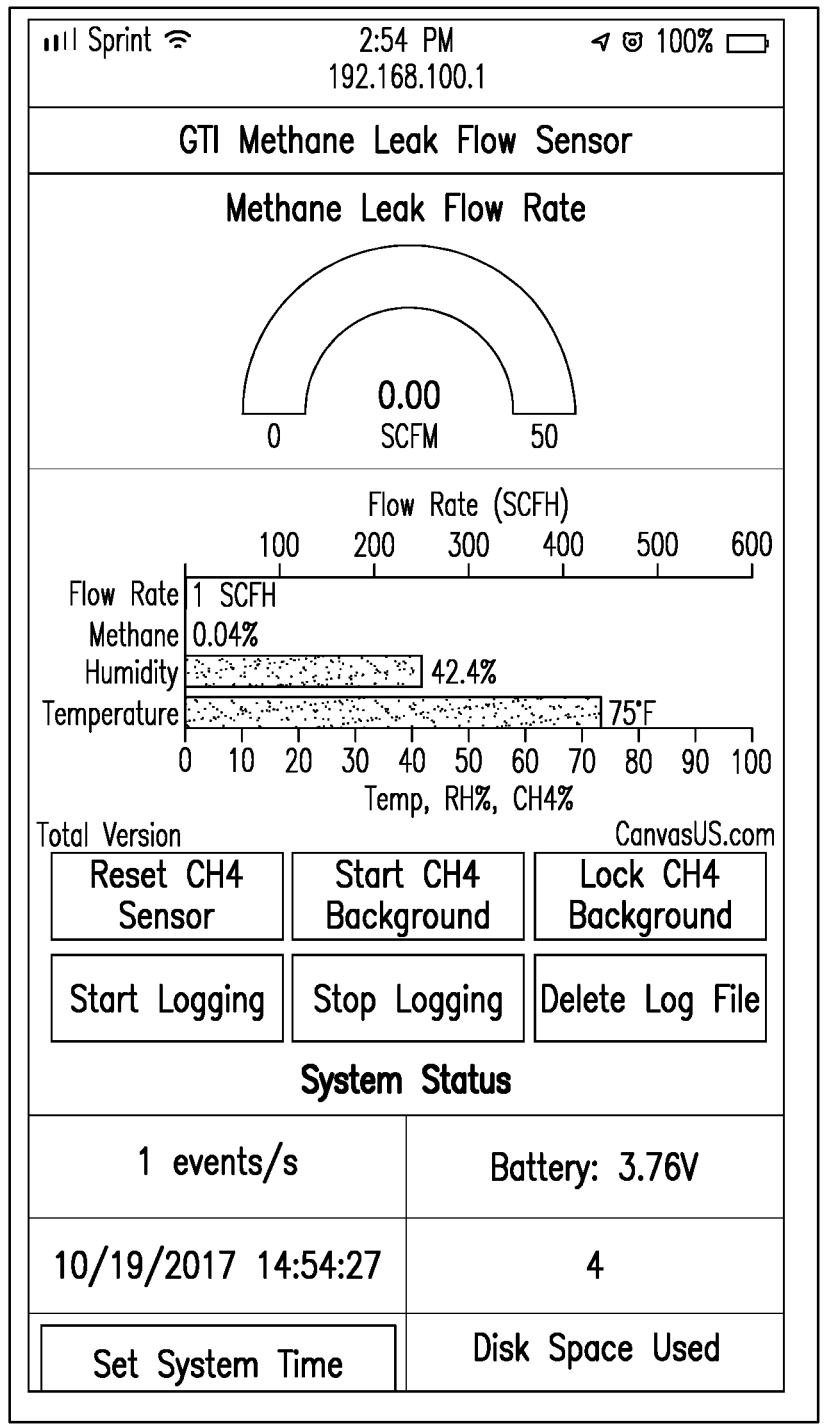
FIG. 8 illustrate a graphical user interface according to one embodiment of this invention.

FIG. 8 shows a further exemplary user interface for the flow sensor. A button layout makes it easy to see which actions are available to perform. Options are made available when the preceding task has been completed. Prompts ask the user to confirm the task's execution. Desirably sensor data is being recorded and sent to the connected device (phone or tablet) at precise 1-second intervals. System time can be set via the connected device's clock. This ensures accurate timestamps for the acquired data set. A Methane Leak Rate calculation is performed and captured with the other data. This value is highlighted on the top of the user interface. A Battery Voltage checker can be integrated into the device's circuitry to provide the user with battery status information without impacting battery life. A chart layout shows sensor information in an easy to read format without getting in the way of the Methane Leak Rate indicator. The user interface buttons allow a Methane Leak Rate calculation only after a Background Methane value has been adequately captured.

Thus the invention provides methods, devices, and systems for remote gas sensing and monitoring. The remote sensing of this invention improves safety and/or frees workers from staying and monitoring a leakage repair. The sensor nodes can be setup in any needed configuration, providing flexibility and adaptability to the system for a site for improved safety and efficient monitoring.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A system for leak detection and monitoring, the system comprising: a plurality of portable leak detection devices each adapted to be distributed in a device array of different spaced apart locations over an area of interest that contains a suspected gas leak, wherein when distributed and activated the plurality of leak detectors form an ad hoc local area mesh network over the area of interest, each of the plurality of portable leak detection devices comprising:

a gas sensor;

an aggregator for aggregating leak detection data obtained from the gas sensor of each of the plurality of leak detection devices;

a peer-to-peer communication antenna configured to communicate wirelessly amongst and between the plurality of portable leak detection devices in the device array, and to receive leak detection data from all of the plurality of portable leak detection devices in the device array; and a user interface communication antenna configured to communicate wirelessly with mobile access devices, wherein each of the peer-to-peer communication antenna and the user interface communication antenna communicate wirelessly by a short-range communication protocol; and a display user interface to display and allow viewing of leak detection data of the device array, wherein the display user interface with leak detection data of all of the plurality of portable leak detection devices in the device array is directly accessible from any selected one of all of the portable leak detection devices by the mobile access devices at the area of interest by directly connecting, using the short- range communication protocol, to the user interface communication antenna of the selected any one of all of the plurality of portable leak detection devices, without a designated central or coordinator node; wherein the display user interface comprises a web browser displayable on each of the mobile access devices, and the display user interface is simultaneously accessible on the each of the mobile access devices from and through connection with the selected any one of the plurality of portable leak detection devices and also from direct connection to any other of the portable plurality of leak detection devices, and wherein the selected one of all of the portable leak detection devices is a closest one of the portable leak detection devices in proximity to a corresponding one of the mobile access devices at the area of interest.

2. The system of claim 1, wherein each of the leak detection devices further comprises a temperature sensor and/or a humidity sensor in combination with the gas sensor.

3. The system of claim 1, wherein the aggregator further communicates with a server remote from the area of interest via a wireless signal.

4. The system of claim 1 further comprising a fan in combination with the gas sensor, wherein the fan moves ambient air over the gas sensor.

5. The system of claim 1, further comprising a housing including the gas sensor and the user interface communication antenna, the housing including a flow opening inlet disposed at a downward or lower end of the housing, wherein the downward or lower end of the housing is configured to be disposed downward toward and adjacent to the ground during the leak detection and monitoring.

6. The system of claim 5, wherein a bottom end surface of the housing comprises the flow opening inlet, and a flow path connects the flow opening inlet to the gas sensor.

7. The system of claim 6, further comprising a fan to draw sample air through the flow opening inlet and the flow path.

8. The system of claim 7, further comprising a flow rate sensor in combination with the flow opening inlet, wherein the fan moves ambient air over or through the flow rate sensor, and the at least one display user interface is configured to manually activate and deactivate the fan.

9. The system of claim 6, wherein the flow path extending from the flow opening inlet has an internal surface tapered toward the gas sensor.

10. The system of claim 1, further comprising a housing including the gas sensor and the user interface communication antenna, the housing including a flow opening inlet disposed at a downward or lower end of the housing during the leak detection and monitoring, wherein the housing comprises a tubular stem adapted to be installed at least partially underground, and further comprising the user interface communication antenna at an end of the housing above the ground.

11. The system of claim 10, wherein the stem is open at an end opposite the user interface communication antenna to allow air into the stem and over the sensor, and further comprising a check valve between the end and the sensor, the check valve configured to close when water enters the stem.

12. A method for remote gas sensing in an area of interest, the method comprising:
   arriving at an area of interest that contains a suspected gas leak;
   distributing a plurality of portable gas sensors in different spaced apart locations on a ground surface over the area of interest that contains the suspected gas leak;
   activating the plurality of portable gas sensors to form an ad hoc local area mesh network over the area of interest;
   the plurality of portable gas sensors aggregating leak detection data obtained from the plurality of portable gas sensors over the ad hoc local area mesh network via wireless connectivity by a short-range communication protocol;
   accessing the leak detection data of all of the plurality of portable gas sensors with a mobile access device in wireless connection with one of the plurality of portable gas sensors; and
   displaying the aggregate data in a user interface via a web browser wherein the aggregate data is simultaneously accessible via a plurality of wireless mobile access devices at the area of interest from the one of the plurality of portable gas sensors and from a direct wireless connection with any one of the plurality of portable gas sensors, wherein each of the mobile access devices at the area of interest can connected directly to a closest one of the plurality of portable gas sensors at the area of interest.

13. The method of claim 12, wherein a first responder is present at the area of interest and wherein the method further comprises:
   the first responder selectively positions one or more of the plurality of gas sensors.

14. The method of claim 12, wherein the aggregate data is accessible from any and every one of the plurality of gas sensors, and further comprising accessing the leak detection data of all of the plurality of gas sensors with the mobile access device in wireless connection with a closest one of the plurality of gas sensors.

* * * * *